US007627483B2

(12) United States Patent
Miller et al.

(10) Patent No.: US 7,627,483 B2
(45) Date of Patent: Dec. 1, 2009

(54) ONLINE DONATION MANAGEMENT SYSTEM

(75) Inventors: Eric Neil Miller, Atlanta, GA (US); William C. Standifer, IV, Atlanta, GA (US)

(73) Assignee: Donate.Net, Inc., Atlanta, GA (US)

( * ) Notice: Subject to any disclaimer, the term of this patent is extended or adjusted under 35 U.S.C. 154(b) by 1187 days.

(21) Appl. No.: 09/770,599

(22) Filed: Jan. 26, 2001

(65) Prior Publication Data

US 2001/0051875 A1 Dec. 13, 2001

Related U.S. Application Data

(60) Provisional application No. 60/178,932, filed on Feb. 1, 2000.

(51) Int. Cl.
*G06Q 99/00* (2006.01)
*G06Q 30/00* (2006.01)
(52) U.S. Cl. .............................................. 705/1; 705/26
(58) Field of Classification Search ...................... 705/1, 705/11, 14, 26, 27, 39, 40, 44, 10
See application file for complete search history.

(56) References Cited

U.S. PATENT DOCUMENTS

| 5,890,137 | A | * | 3/1999 | Koreeda | 705/26 |
| 5,894,554 | A | * | 4/1999 | Lowery et al. | 709/203 |
| 5,909,794 | A | * | 6/1999 | Molbak et al. | 194/216 |
| 5,920,847 | A | * | 7/1999 | Kolling et al. | 705/40 |
| 6,029,141 | A | * | 2/2000 | Bezos et al. | 705/27 |
| 2002/0069108 | A1 | * | 6/2002 | Aubertin et al. | 705/14 |

FOREIGN PATENT DOCUMENTS

CA 2298405 * 2/1997

OTHER PUBLICATIONS

"Tis the season . . . Children", PR Newswire, p. 0742, Nov. 29, 1999.*
WWW.DONATE.NET (see Dec. 12, 1998 and Jan. 25, 1999).*
"OpenSite Tech . . . E-business", Oct. 13, 1998, Business Wires, p. 1437, Dialog File 16: 05888257.*
Hopkins, B.R. "Charity auctions and tax laws", Fundraising Management, v25n9, pp. 48-50, Nov. 1994, Dialog 15: 00937053.*

(Continued)

*Primary Examiner*—Tan Dean D Nguyen
(74) *Attorney, Agent, or Firm*—Charles L. Warner; Bryan Cave, LLP

(57) ABSTRACT

A system for soliciting donations via the World Wide Web or Internet. A donor may, if desired, be an individual or an individual representing an organization with a particular interest in a charitable organization. The charitable organization is a nonprofit organization that has a presence or website on the Internet. The system is integrated with the charitable organization's website. The charitable organization has cataloged on the system's database particular items or assets as gifts to the donor based on the contribution area of interest of the donor. The donor, in communication with the charitable organization, selects a donation by activating a hyperlink to the system's website. Transparent to the donor, the system is now in communication with the donor and the charitable organization. The system facilitates the donation process, the selection of gifts, the implication and effect of the tax deduction, and the delivery of the selected gifts.

9 Claims, 19 Drawing Sheets

OTHER PUBLICATIONS

"From PR . . . Editors", Nov. 10, 1998, PR Newswire, p. 9587, Dialog 16: 05941981.* www.redcross.org.* www.fhcrc.org.*

Grobman, G.M. "Fundraising on the Internet", 1999, Amherst H. Wilder Foundation, pp. 1-51.*

Corson-Finnerty, A. "Fundraising and Friend-Raising on the Web", 1998, Amherst H. Wilder Foundation, pp. 1-52.*

Allen, N. "Fundraising on the Internet", 1996, Strathmoor Press, Inc., pp. 1-163.*

* cited by examiner

| your company logo here | Donations Selector | | About Us |
|---|---|---|---|
| | ⌕ The Secure Donations Network! | donate.net | Help Page |

To make a general donation click the GIVE button to enter a specific amount.

To select one of the donation options, click the ADD button. To select another of that option, click the ADD button again.

To learn more about an option, click on the text to see a description.

| | Qty | Name (Click item for Description) | Unit Amt. | Tax Ded. | Total Amt. |
|---|---|---|---|---|---|
| Donation | | | | | |
| GIVE | 0 | General Donation | | Yes | $0.00 |
| GIVE | 0 | Tribute Donation | | Yes | $0.00 |
| Reports and Archives | | | | | |
| ADD | 0 | Report | $5.00 | $5.00 | $5.00 |
| Special Programs | | | | | |
| ADD | 0 | Silver level Sponsorship | $25.00 | $25.00 | $0.00 |
| ADD | 0 | Golden level Sponsorship | $100.00 | $100.00 | $0.00 |
| ADD | 0 | Platinum level Sponsorship | $1,000.00 | $1,000.00 | $0.00 |
| Publications | | | | | |
| ADD | 1 | Book | $5.00 | $4.00 | $5.00 | CLR |
| E-mail Postcards | | | | | |
| VIEW | 0 | Member Postcard 1 | $5.00 | $5.00 | $0.00 |
| VIEW | 0 | Member Postcard 2 | $5.00 | $5.00 | $0.00 |
| VIEW | 0 | Get Well Postcard | $5.00 | $5.00 | $0.00 |

FIG. 3A

Conscious Change: Enhanced Test Organization: Donations Selector

| | | | | | |
|---|---|---|---|---|---|
| [VIEW] | 0 | Happy Holidays Postcard | $5.00 | $5.00 | $0.00 |
| [VIEW] | 0 | Christmas Postcard | $5.00 | $5.00 | $0.00 |
| [VIEW] | 0 | Have a Nice Day Postcard | $5.00 | $5.00 | $0.00 |
| [VIEW] | 0 | Peace Love Joy Postcard | $5.00 | $5.00 | $0.00 |
| [VIEW] | 0 | Member Postcard 3 | $5.00 | $5.00 | $0.00 |
| | | | Total: | $4.00 | $5.00 |

You are offering to make 1 donation, as indicated above.
If this is correct click the CONTINUE button to enter in your payment information.

[EMPTY] [CONTINUE]

| your company logo here | Send Everyone ECard Greetings | | About Us |
|---|---|---|---|
| | ⌐ The Secure Donations Network! | donate.net | Help Page |

~21

Confirmation

Thank you for your donation! It is people like you who make this world a better place. Good luck to you and all the organizations you support.

Your contribution number is TQAPAMOPRVS12NRLOGM0060MRS.

Bank credit card transaction approval code was Demo 39.

This transaction will appear on your credit card statement as www.donate.net. Although a confirmation e-mail will be sent to the address you provided, you may want to print this page from your browser and retain it for your records.

| Label | Qty | Name | Unit Price | Total Price | Deductible Value |
|---|---|---|---|---|---|
| 9999116 | 1 | Book | $5.00 | $5.00 | $4.00 |

Deliver To: Eric Miller
931 Monroe Drive, Suite 102-281
Atlanta
GA
30308

TOTAL:      $5.00      $4.00

(E) ~22    (F) ~23

NOTE: An error occurred attempting to send the e-mail copy of this confirmation to 'Support@Donate.net'. It will not be sent. Please rely on a printed copy of this screen for your records (use the print function in your browser to print a copy on your printer).

your company logo here

Please click here to [RETURN TO] Enhanced Test Organization web site.

FIG. 4

Edit Product '9999116'

Label: 9999116
Name: Book
Description: Test Book to be shipped to you your product image here Image URL: /con_assets/products_images/product.gif
Arbitrary Donation: No
Unit Price (*): $5.00 ← (H)
                        80
Deductible Value (*): $4.00 ← (G)
                              25
Tribute (arbitrary only): No
Category: Publications
Fulfillment: Physical Delivery
Product URL (only for items with E-mail delivery or E-mail Postcards):

Postcard Logo URL: (Postcard Only)

Postcard Logo URL: (Postcard Only)

Dept: Enhanced Test Organization

Manager | Products | Departments | Orders | Events | Teller

| your company logo here | Send Everyone ECard Greetings | | About Us |
|---|---|---|---|
| | 🗝 The Secure Donations Network! | donate.net | Help Page |

General Donation

A general donation of the amount you choose in the box type the whole dollar amount you wish to donate. Then click on the ADD button, and make sure the donation appears exactly as you wish to give it on the donation selector.

Minimum donation amount is $5.
If you wish to go back to the donation options without entering a donation amount, click on the RETURN button.

$ [0] .00 — 29

[RETURN] — 30    [ADD] — 31

ONLINE DONATION MANAGEMENT SYSTEM

CROSS-REFERENCE TO RELATED APPLICATION

The present application claims benefit of provisional patent application Ser. No. 60/178,932, filed Feb. 1, 2000, the disclosure of which is incorporated by reference herein.

FIELD OF THE INVENTION

The present invention relates to a charitable organization's solicitation for a monetary donation. In particular, the invention relates to a charitable organization's solicitation for a monetary donation via the Internet. More particularly the invention relates to a system that enables an individual donor to contribute to selected projects of the charitable organization via the Internet.

BACKGROUND OF THE INVENTION

Special interests of individuals may be current events, health concerns, safety concerns, religious concerns, or any other variety of concerns. Information about special interests and concerns may be found in the public libraries, reference volumes, or from charitable organizations who maintain public information for distribution to individuals. Charitable organizations are defined as non-profit or not for profit type organizations.

One medium for providing information to individuals is through the World Wide Web or Internet. The Internet is a tool that enables charitable organizations to maintain or provide websites on the Internet and present programs, projects, and causes that exemplify their particular endeavors. Interested individuals may, if desired, view the charitable organization's endeavors via the Internet.

Soliciting monetary donations from individuals by charitable organizations in support of the charitable endeavors is a costly and time-consuming effort. Attempts in the past to solicit monetary donations from individuals focused on telephone solicitation, direct mail, radio, and television. These attempts have produced limited results due to the high cost of producing events that appeal to prospective individual donors. A donor is defined as an individual person or organization wishing to make a monetary contribution to a charitable organization.

It would desirable to have information about a particular charitable organization's projects that focused on the donor's concerns. Incorporated into the charitable organization's projects would be an appeal for a donation to support that particular project. It would be further desirable to receive the information and appeal via the Internet.

SUMMARY OF THE INVENTION

The present invention is a system of soliciting donations via the World Wide Web or Internet. The present invention is installed on a computer or server with Internet access. The charitable organization integrates with this invention through hyperlinks into the organization's specific database section site within the invention's database. The charitable organization has cataloged with the present invention selected items or assets to be presented to a donor as gifts based on the area of interest and contribution level of the donor. The catalog listing of these items or assets resides on the present invention's database. The charitable organization's website may, if desired, display a banner hyperlink to the present invention's website. The donor, in communication with the charitable organization, selects a donation option by activating a link to the present invention's website i.e., clicking on a selectively displayed hyperlink icon. Transparent to the donor, the present invention is now in communication with the donor via the charitable organization's website. The present invention facilitates the donation process, the selection of gifts in response to selected contributions, and the delivery of the selected gifts.

A donor's computer monitor will display a Donation Selector "screen-shot". The Donation Selector functioning in concert with a Donor Experience Object, a Give Object, Add Item Object, Empty Selector Object, Clear Item Object, Delivery Selector Object, Payment Object, and Confirmation Object to command and control the presentation, delivery, and confirmation of selected monetary donations or items and assets that may be selected by the donor for a monetary contribution to the charitable organization.

An organization's management computer monitor may, if desired, display an Editing Tool "screen-shot" via selected access to the present invention's website. The Editing Tool in concert with an Item Creation Object commands and controls additions, deletions, reports, and updates of selected monetary donations, programs or items that may be requested by the donor in return for a monetary contribution to the charitable organization.

When taken in conjunction with the accompanying drawings and the appended claims, other features and advantages of the present invention become apparent upon reading the following detailed description of the embodiments of the invention.

BRIEF DESCRIPTION OF THE DRAWINGS

The invention is illustrated in the drawings in which like reference characters designate the same or similar parts throughout the figures of which:

FIG. 3a illustrates a computer monitor display of a Donation Selector of FIG. 1, FIG. 3b illustrates a continuation of the Donation Selector of FIG. 3a, FIG. 4 illustrates a computer monitor display of Confirmation of a donor's selection of FIG. 1, FIG. 5 illustrates a computer monitor display of an Editing Tool of FIG. 1, FIG. 6 illustrates a computer monitor display of a General Donation Opportunity of FIG. 1.

DETAILED DESCRIPTION OF THE PRESENT INVENTION

Figure 1:
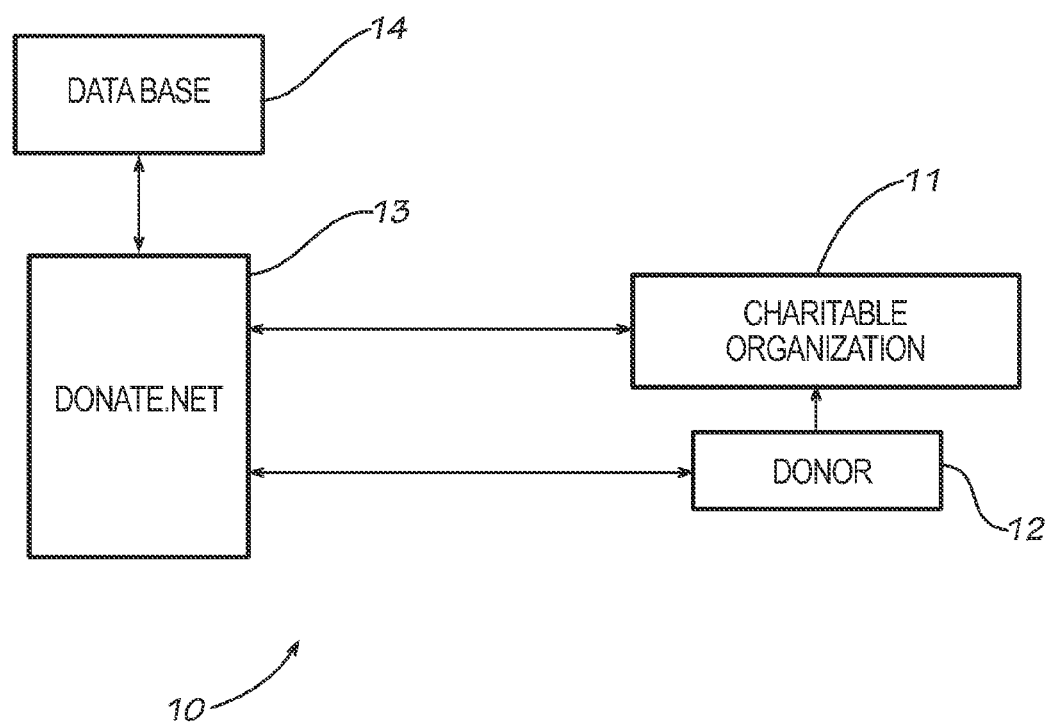
FIG. 1 illustrates a top-level block diagram view of the preferred embodiment of the present invention.

Before describing in detail the particular improved system for facilitating a donation to a charitable organization in accordance with the present invention, it should be observed that the invention resides primarily in the novel data structures of the system software and not in the combination of conventional system apparatus. Examples of a system apparatus are a computer, telephone network, PBX system, or a communication system linking the system apparatus by a local area network, wide area network, or Internet network. The present invention utilizes discrete subsystems or subassembly components, and associated control of the aforementioned system apparatus and components. The invention is not in the particular detailed configuration of the system apparatus but in the command and control thereof. Accordingly, the data structures, command, control, and arrangement of the present invention have, for the most part, been illustrated in the drawings by readily understandable block diagrams and flowcharts. The drawings show only those specific details that are pertinent to the present invention in order not to obscure the disclosure with structural details which will be readily apparent to those skilled in the art having the benefit of the description herein. For example, the present invention 10, FIG. 1 is a top-level block diagram of the operational features involving a donor 12 in communication with a charitable organization's 11 Internet website. The charitable organization's 11 Internet website, transparent to the donor may, if desired, be hyperlinked to the present invention 10. The present invention 10 exists as an overlying layer of software object programs that are installed over or in concert with selected system apparatus operating software programs or in concert with selected subprograms. The present invention 10, once installed on the server, facilitates transference of selected donations from the donor to the charitable organization 11. Only data objects of the present invention 10 are illustrated in order to simplify and emphasize those portions of the present invention 10 that are most pertinent. The software programs to implement the present invention 10 may be realized in any convenient software program language such as C++ or Smalltalk. Thus, the present invention 10 illustrated in the Figures does not necessarily represent the data structural arrangement of the exemplary system, and is primarily intended to illustrate major object data structures of the system in a convenient functional grouping whereby the present invention may be more readily understood.

An overview of the present invention 10, FIG. 1 is a system for soliciting donations via the World Wide Web or Internet. The donor 12 may, if desired, be an individual or an individual representing an organization with a particular interest in a charitable organization. An example of a charitable organization is the Trees Atlanta, the Atlanta Humane Society, the North Shore Animal League or any other non-profit organization that has a presence or website on the Internet. The present invention 10 is installed on a computer or server with Internet access and linked to the charitable organization's 11 website. The charitable organization 11 has cataloged selected items or assets as gifts to the donor 12 by design and with the organization's sole discretion. The catalog listing of these items resides in the present invention's database 14. The charitable organization's 11 website may, if desired, display a banner hyperlink to link to the present invention's 10 website. The donor 12, in communication with the charitable organization 11, selects a donation by activating a link to the present invention's 10 website i.e., clicking on a selectively displayed hyperlink. Transparent to the donor 12, the present invention 10 is now in communication with the donor 12 and the charitable organization's 11 website. The present invention 10 facilitates the donation process, the selection of gifts in response to selected contributions, data input required for payment of the donation, customization of and delivery of the selected gifts.

A more detailed description of the present invention 10, FIG. 1: The donor 12 may, if desired, have a particular interest in the subject matter presented by a particular charitable organization 11. The charitable organization 11 may, if desired, have a plurality of projects available that are in need of a monetary contribution. The donor 12 in communication with the charitable organization 11 may, if desired, review a selected project of the charitable organization 11. The present invention's 10 hyperlink may, if desired, be selectively positioned within selected projects of the charitable organization 11. The donor 12 is motivated to make a contribution in support of the selected project he is reviewing by clicking the present invention's 10 hyperlink.

The computer monitor display 16, FIGS. 3a and 3b viewed by the donor 12 indicates a selected catalog containing previously stored donation items for selection. A selection of catalog item or items helps fund the donor's 12 selected project. If desired, the donor 12 may select to give an arbitrary restricted or unrestricted donation. The system will allow the entire donation to be acknowledged as fully tax deductible; or if desired, the donor 12 may select a donation program offered by the selected charitable organization 11. The unit amount 18 of the item selected instantly appears on the computer monitor display 16 along with the income tax deductible amount 19 and the total amount 20 of the donation. After the donor 12 has made a selection, an updated Donation Selector computer monitor display 16 is presented to the donor 12. The updated Donation Selector computer monitor display 16, FIGS. 3a & 3b summarizes all items or assets purchased by the donor 12 and supplies the total donation C and the tax-deductible portion D of the donation. The donor 12 may, if desired, select a delivery address for the item or asset selected. The donor 12 indicates the delivery address by using the Delivery Selector 26 pull-down "Deliver as Billed to" menu 27, FIG. 7. If the donor 12 has selected a general donation to the charitable organization 11, a computer monitor display of a general donation opportunity 28, FIG. 6 is presented to the donor 12. The donor 12 may, if desired, enter a selected amount of donation 29 and click the add icon 31 to give the amount that donor 12 inputted. The Donation Selector, display 16, will reflect the donation selection summary. When the donor 12 is finished, if desired, donor 12 may elect to continue and this will activate a computer monitor display of a Donor Transaction 32, FIG. 8. The Donor Transaction 32, FIG. 8 collects information concerning the donor's 12 method of payment for the general donation or item(s) selected. If desired, the donor 12 may click on the organization's logo to return to the charitable organization's 11 website without completing the donation.

Figure 2:
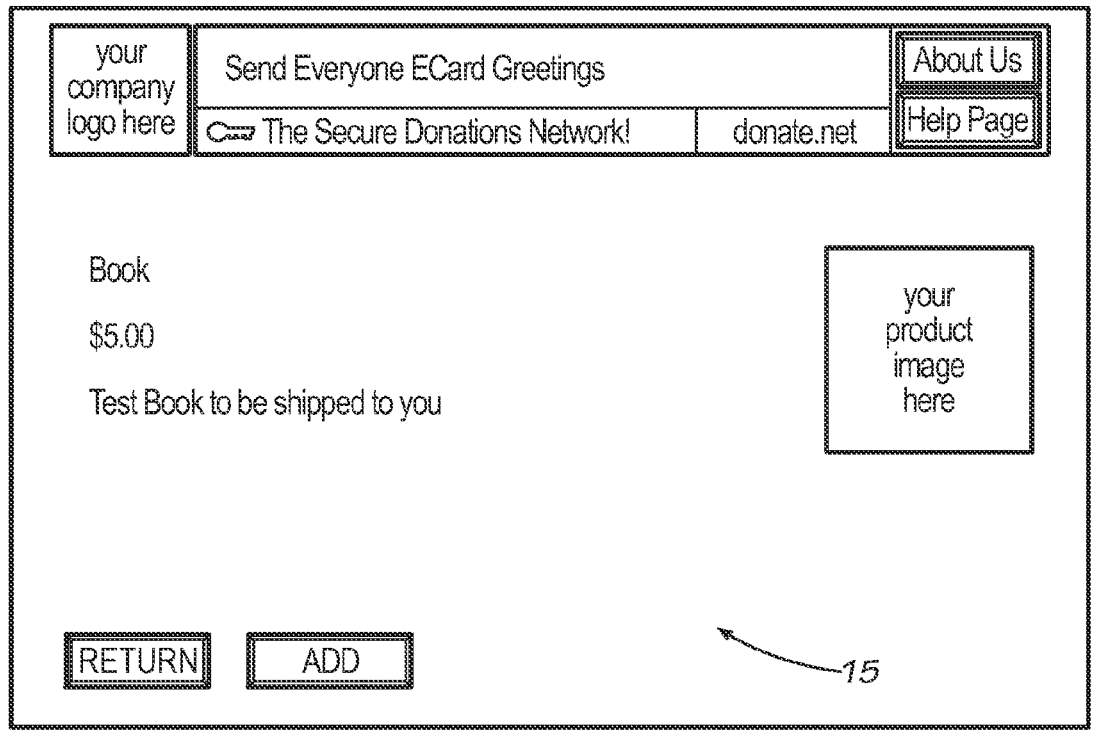
FIG. 2 illustrates a computer monitor display of an item request or selection or donation of FIG. 1.

The charitable organization 11 may, if desired, utilize an Editing Tool 24, FIG. 5 to make additions or modification to the catalog of donation items or assets. For example, the charitable organization 11 sponsors reading projects for school children and desires to solicit donations for the reading project from adults. The charitable organization 11 accomplishes this goal by adding a new and popular book 15, FIG. 2 to its catalog for selection on the present invention's 10 website. The Editing Tool 24, FIG. 5 enables the charitable organization 11 to insert the book 15, the unit price 25 of the book 15, and the expected tax deductible value 26 of the donation.

Figure 9:
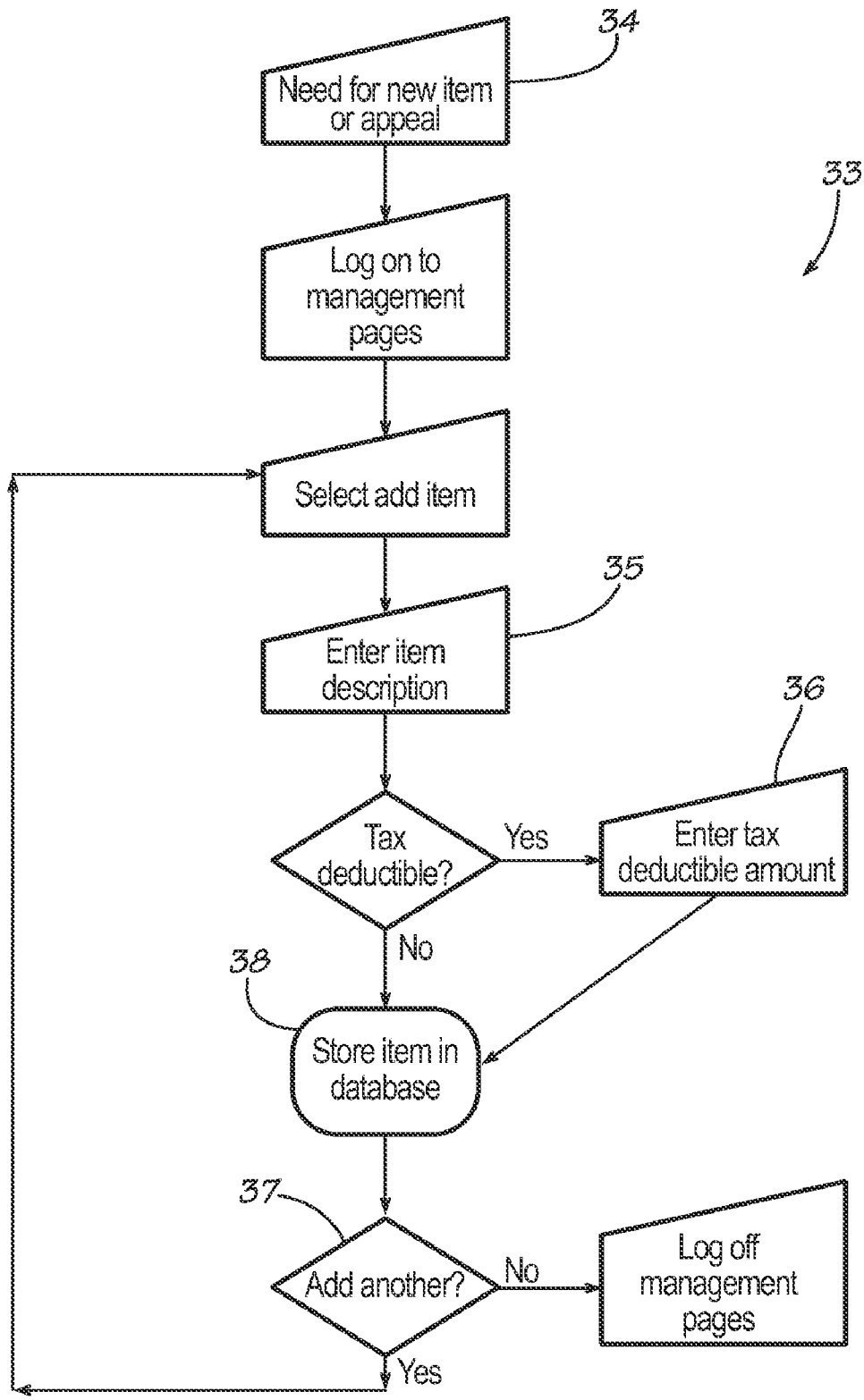
FIG. 9 illustrates an Item Creation Object.

An Item Creation Object 33, FIG. 9 facilitates the creation of the charitable organization's 11 Editing Tool 24, FIG. 5. The Item Creation Object 33 receives a request 34 to add an item to the charitable organization's 11 catalog. The Item Creation Object 33 presents the Editing Tool 24 to a member or selected user associated with the charitable organization 11. The selection process of members or users is determined by a predetermined access code. The Item Creation Object 33 commands and controls the entry of data into the Editing Tool 24 to include entering the description of the items 35, tax deductible amount 36, adding another item 37, and storing 38 the entered information in the database 14, FIG. 1.

Figure 10:
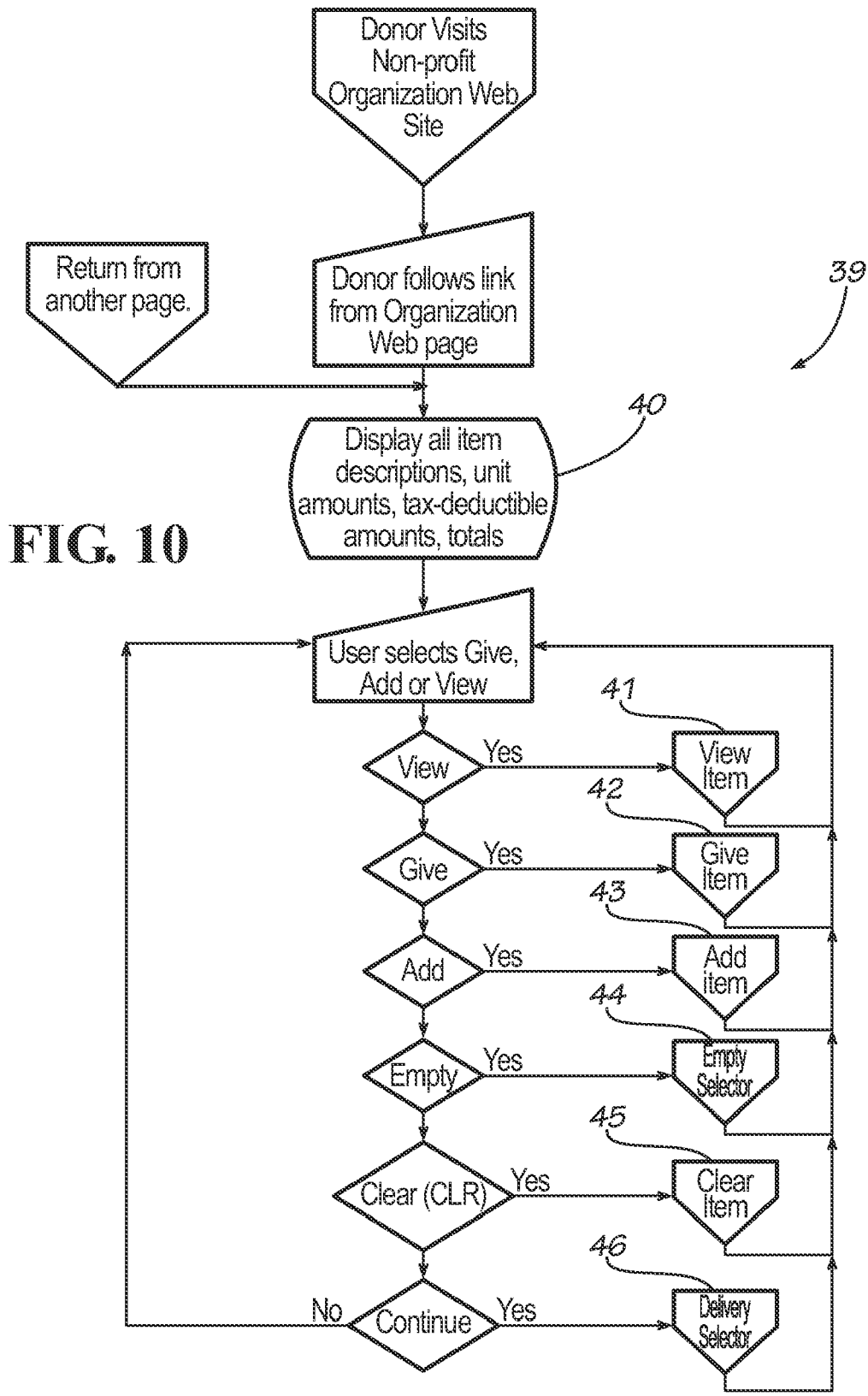
FIG. 10 illustrates a flowchart of a Donor Experience Object.

The Donor Experience Object 39, FIG. 10 commands and controls the entry of data into the Donation Selector 16, FIG. 3a. The Donor Experience Object 39 displays 40, FIG. 10 all items or asset descriptions, unit amounts, tax-deductible amounts, and totals. The Donor Experience Object 39 guides the donor through a plurality of choices to make donations, select and receive gifts, and receive a tax deduction. The Donor Experience Object 39 is in communication with the View Item Object 41, Give Item Object 42, Add Item Object 43, Empty Selector Item Object 44, Clear Item Object 45, and Delivery Selector Object 46. The Donor Experience Object 39, in concert with other objects, facilitates the donations, gifts, and tax deductions for the charitable organization 11 via the present invention's 10 website 13.

Figure 11:
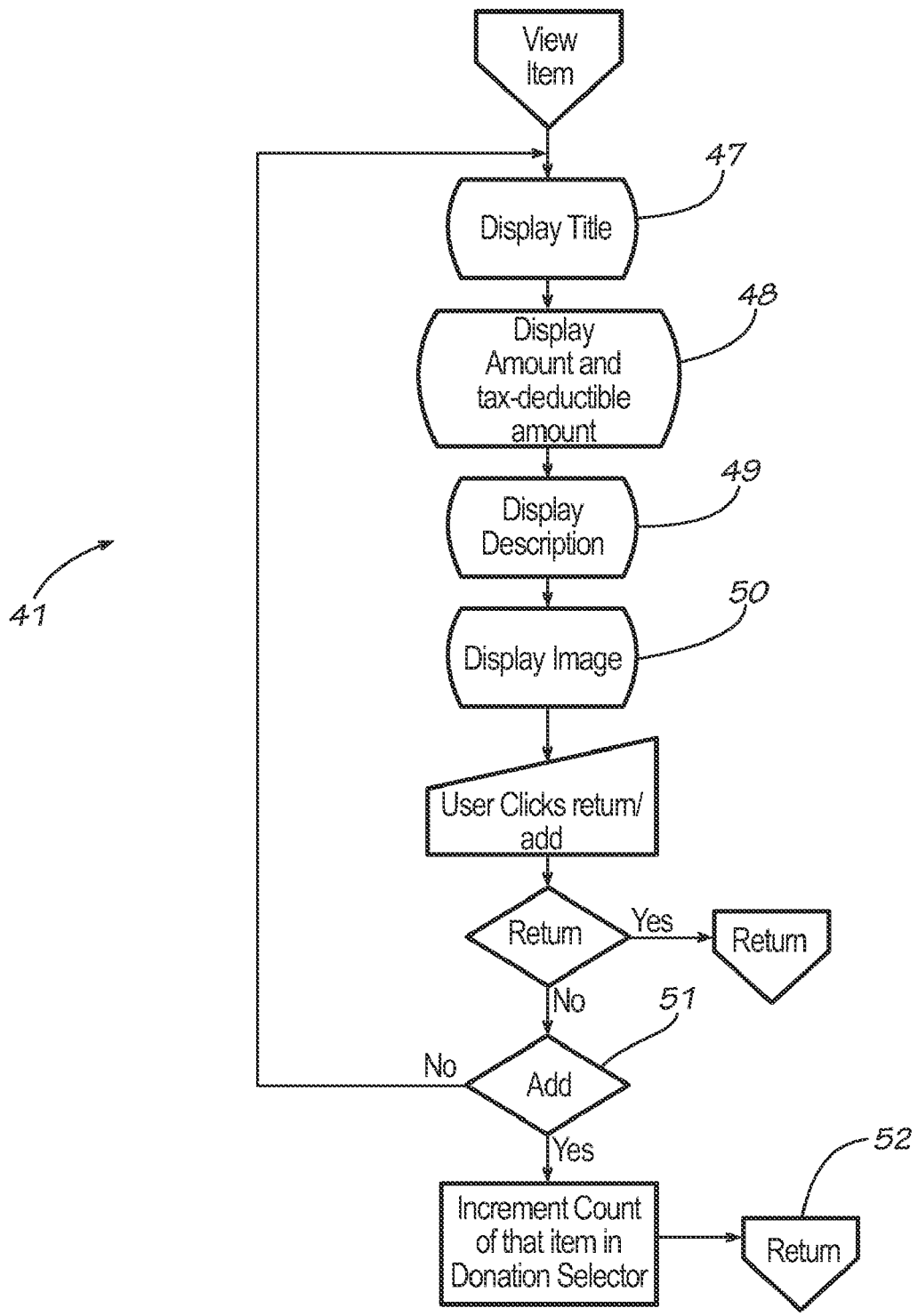
FIG. 11 illustrates a flowchart of a View Item Object.

The View Item Object 41, FIG. 11 receives a request from the Donor Experience Object 39 to display the title 47 of a selected item or asset of interest by the donor. In concert with displaying the title 47, the View Item Object 41 displays the amount of the purchase 48, the description of the Item 49, and the image of the item 50 of the selected title 47 via the Donation Selector 16, FIG. 3a. The View Item Object 41 enables the donor to add selected items 51 and/or return 52 to the charitable organization's 11 website.

Figure 12:
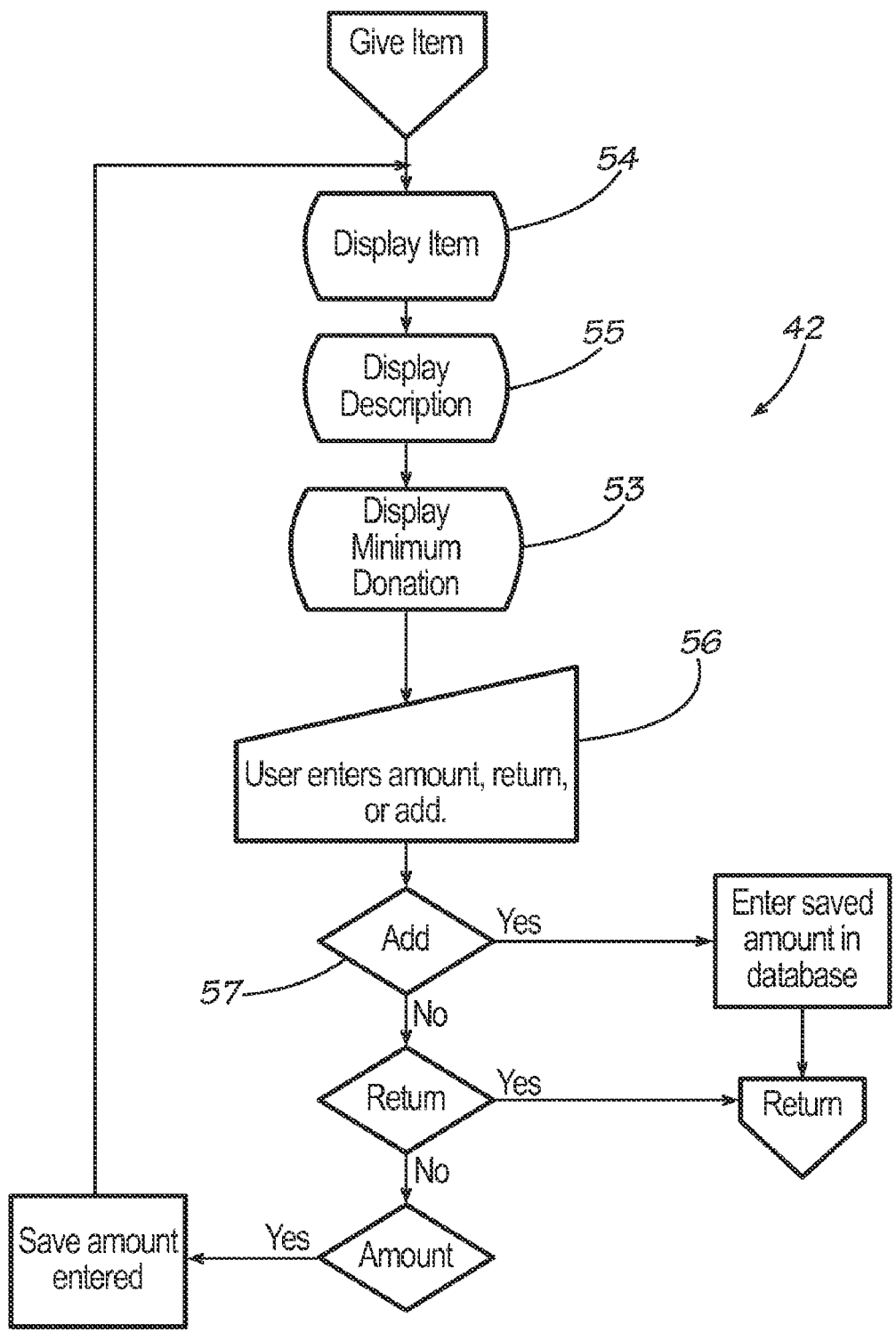
FIG. 12 illustrates a flowchart of a Give Item Object.

The Give Item Object 42, FIG. 12 receives a request from the Donor Experience Object 39 via the Donation Selector 16, FIG. 3a for a "general"* arbitrary donation by the donor. The Give Item Object 42 in concert with the "general"* arbitrary donation opportunity computer monitor display 28, FIG. 6 displays the item 54, the item description 55, and the minimum donation 53. The donor may, if desired, enter the amount of the donation 56 and add to donation, 57, which is displayed as the updated Donation Selector 16.

* Note in the description in this paragraph and in FIG. 6 the "general" is a label name only. The donation could have easily been entitled restricted, other specific fund, or program.

Figure 13:
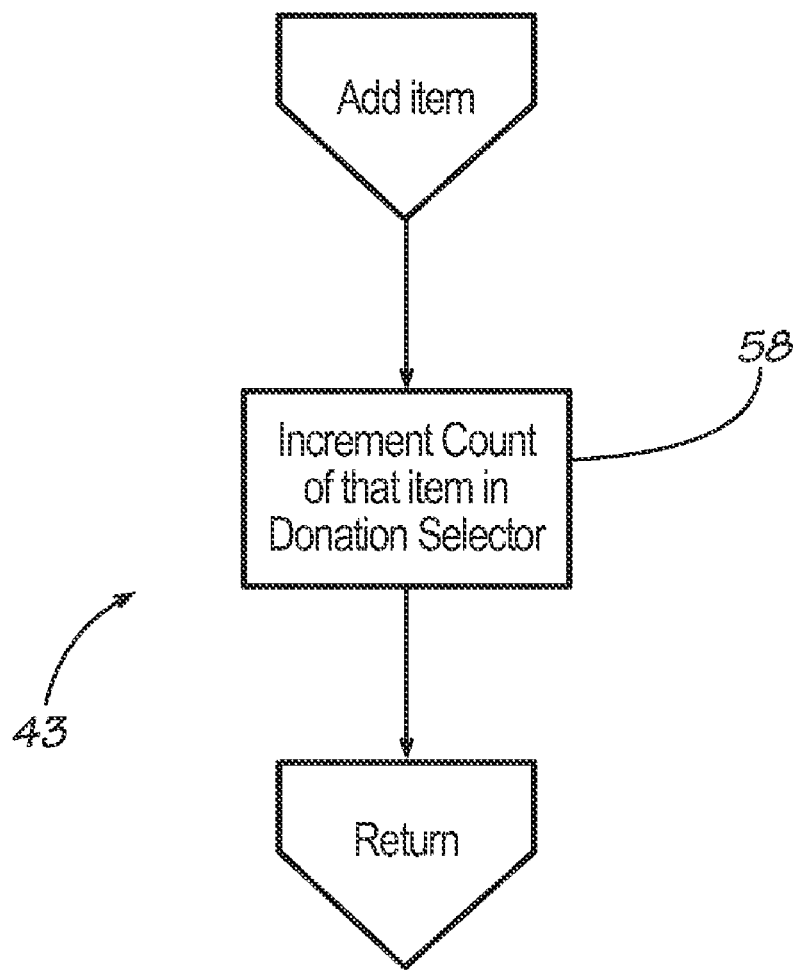
FIG. 13 illustrates a flowchart of an Add Item Object.
Figure 14:
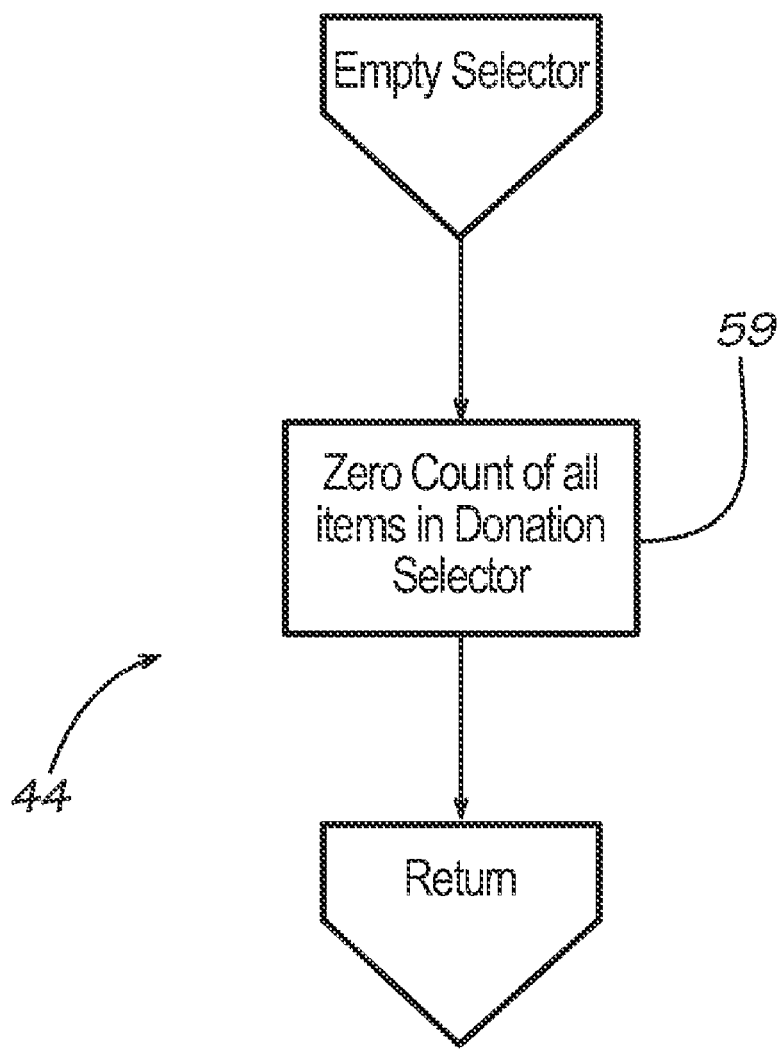
FIG. 14 illustrates a flowchart of an Empty Selector Object.
Figure 15:
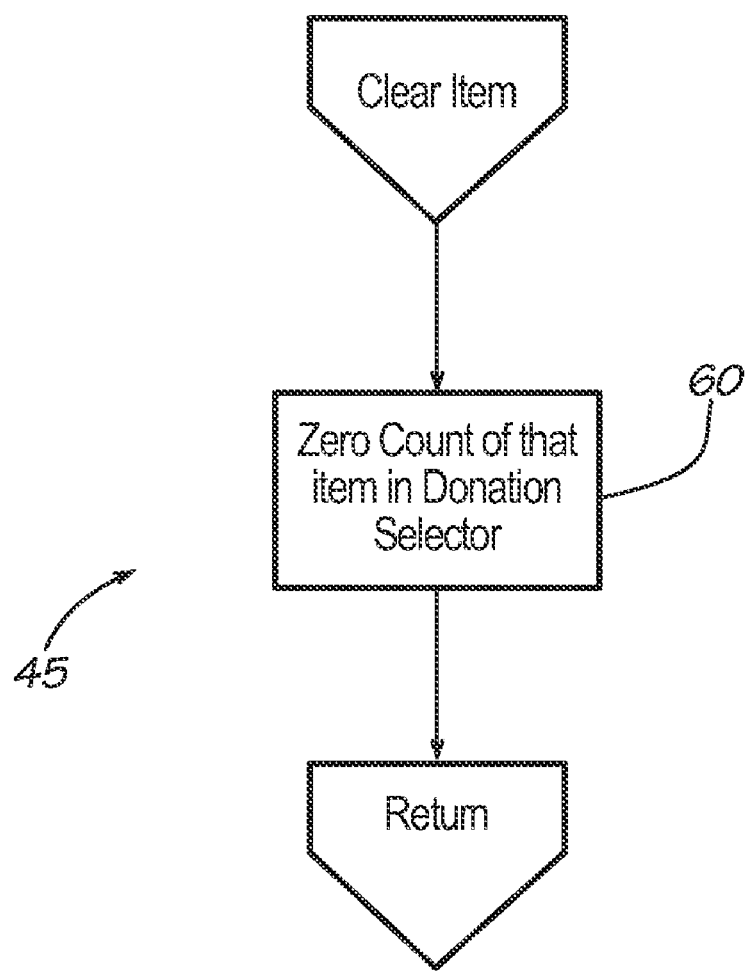
FIG. 15 illustrates a flowchart of a Clear Item Object.

If the donor requests additional items or assets for purchase, the Add Item or Asset Object 43, FIG. 13 in communication with the Donor Experience Object 39 increments the count of items or assets 58 via the Donation Selector 16, FIG. 3a. If the donor requests no additional items he may, if desired, request to empty or cancel all previous items or asset selections. The Donation Selector 16 in concert with the Empty Selector Item Object 44 commands the count of selected items or assets to zero 59. If the donor requests no additional items or assets he may, if desired, request to empty or cancel a selected item. The Donation Selector 16 in concert with the Clear Item Object 45 cancels a selected item 60.

Figure 7:
FIG. 7 illustrates a computer monitor display of a Delivery Selector of FIG. 1.
Figure 16:
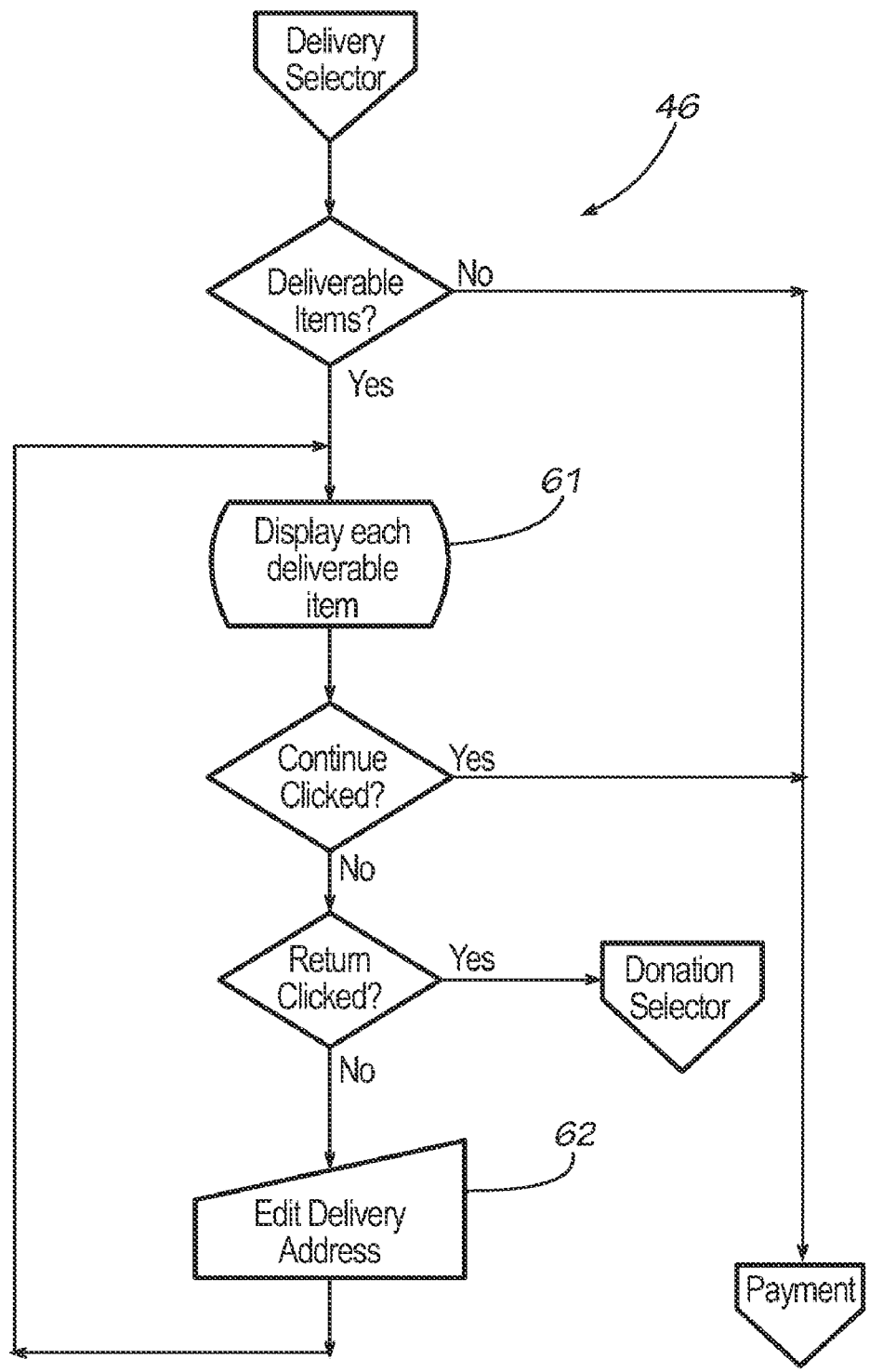
FIG. 16 illustrates a flowchart of a Delivery Selector Object.

After the donor has selected all purchases, the Delivery Selector Object 46, FIG. 16 in concert with the Delivery Selector 26, FIG. 7 orchestrates the delivery of the selected purchases to the donor. The Delivery Selector Object 46 commands the computer monitor display of the Delivery Selector 26 to display each deliverable item 61. The donor is prompted to edit the deliver information display on the drop down menu 27, FIG. 7 via the Delivery Selector Object's 46 command edit delivery address 62, FIG. 16. The donor clicks the continue icon 63 on the Delivery Selector 26 whereby the Payment Object 64, FIG. 17 is activated.

Figure 8:
FIG. 8 illustrates a computer monitor display of a Donor Transaction of FIG. 1.
Figure 17:
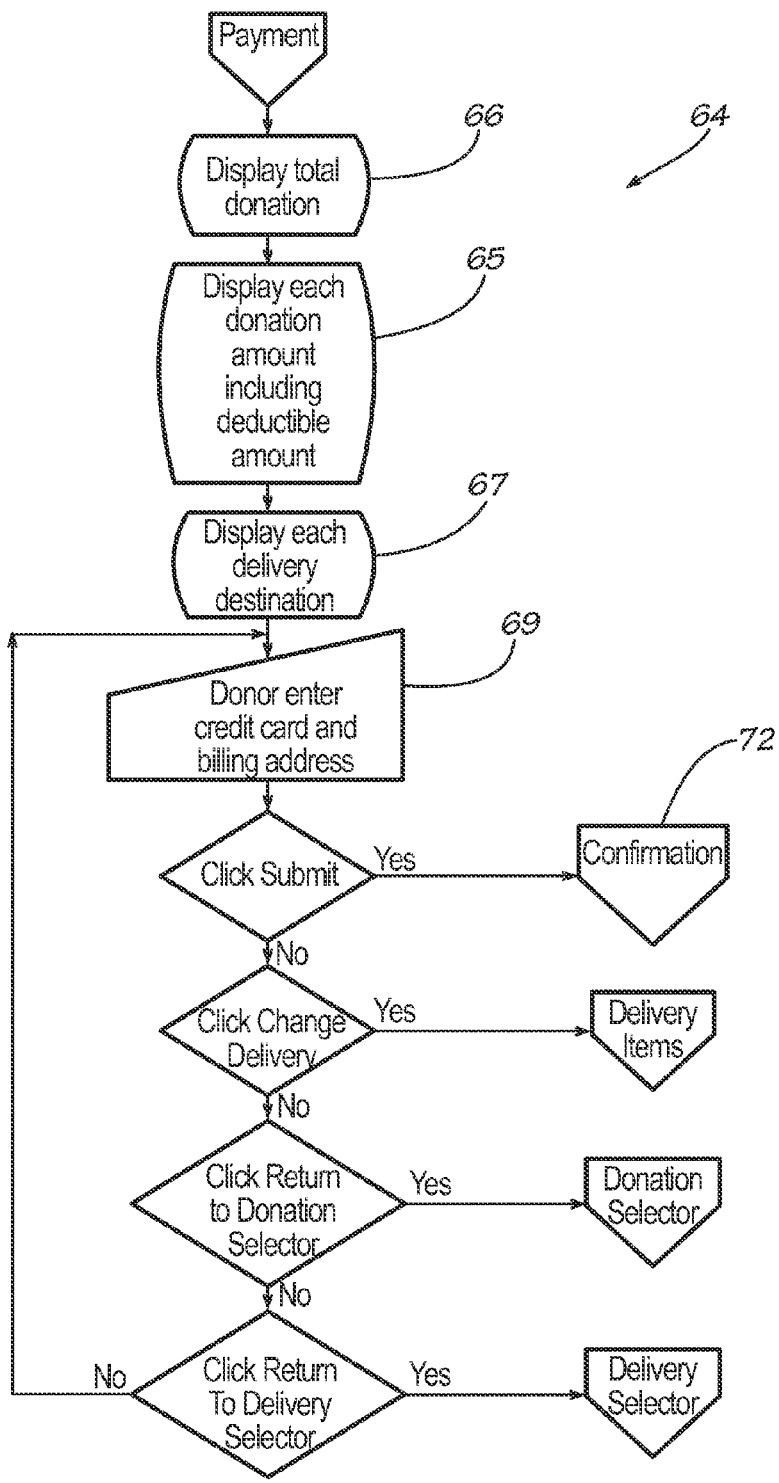
FIG. 17 illustrates a flowchart of a Payment Object.

The Payment Object 64, FIG. 17 in concert with the computer monitor display of the Donor Transaction 32, FIG. 8 facilitates the payment and delivery of the selected purchases by the donor. The Payment Object 64 commands the computer monitor display of the Donor Transaction 32 to display each donation amount including the tax deductible amount 65, the total donation amount 66, and delivery information 67. The donor enters credit card information 68 and billing information 70, FIG. 8 into the designated or provided blocks via the Payment Object's 64 manual input command 69. Upon completion of all the required entries and review of the donation selections made by the donor, the donor may, if desired, click the submit icon 71. Clicking the submit icon 71 activates the Confirmation Object 72, FIG. 18.

Figure 18:
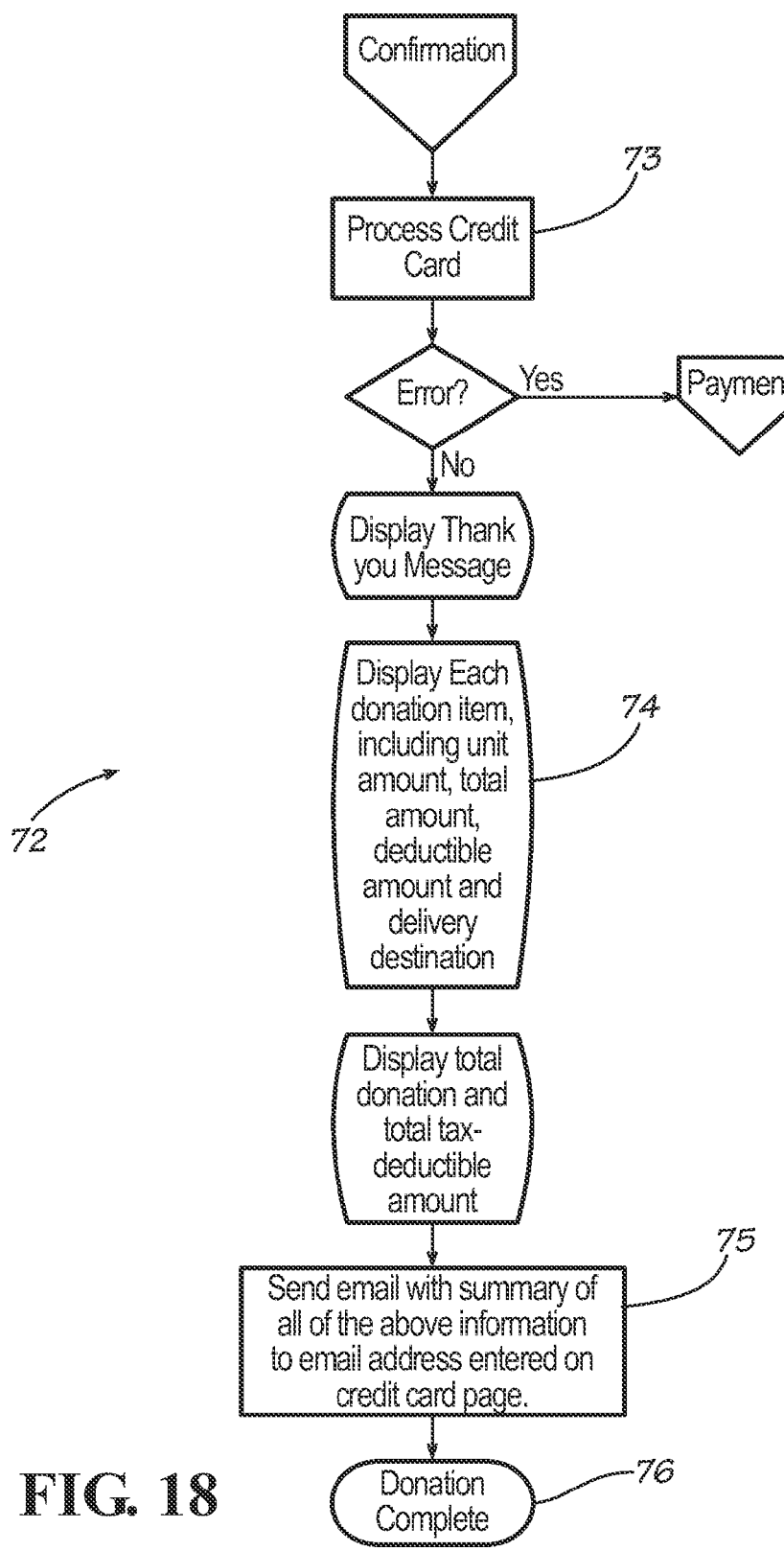
FIG. 18 illustrates a flowchart of a Confirmation Object.

The Confirmation Object 72, FIG. 18 in communication with the computer monitor display of the Confirmation of the donor's selection 21, FIG. 4 facilitates the processing of the credit card information 73, FIG. 18, the display of each donation item, including unit amount, total amount, deductible amount, and delivery destination 74. The Confirmation Object 72 further commands the sending of an email 75 with a summary of all transactions with the present invention 10. The Confirmation Object 72 terminates 76 the interaction between the donor and the present invention 10. The donor's communication link is returned to the charitable organization's 11 website.

The present invention 10 records all transactions and interactions with the donors who access the present invention's 10 website 13. Reports may, if desired, be generated detailing the donor's name, address, age and other demographic information. The charitable organization 11 may, if desired, gain restricted access to the present invention's 10 website 13 and review the all transactions to the organization by donors. If desired, the charitable organization 11 may request a separate report detailing selected information recorded during the transaction between the present invention 10 and selected donors. The charitable organization 11 may, if desired, receive the report by email or in a database format for importing into a contact manager software application for further follow-up and contact.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. Means-plus-function clause is intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

We claim:

1. A method for a donor to make a monetary charitable contribution to a charitable organization, comprising the steps of:
  (a) receiving at a first Internet website an indication of interest from a donor to make a monetary contribution to a charitable organization, the first Internet website being an Internet website of the charitable organization;

(b) hyperlinking the donor to a second Internet website to allow the donor to make the monetary contribution, the second Internet website not being an Internet website of the charitable organization;

(c) the second Internet website providing information regarding projects of the charitable organization to the donor;

(d) the second Internet website receiving a selection of a project from the donor;

(e) the second Internet website providing a plurality of contribution options to the donor for the selected project, the contribution options comprising at least a gift and at least one of the following other contribution options: a sponsorship level, a membership, or a purchase of a tangible item;

(f) the second Internet website providing information to the donor regarding a minimum monetary donation amount and a tax deductible amount in conjunction with at least one of the other contribution options;

(g) the second Internet website receiving a selection of a contribution option from the donor;

(h) the second Internet website receiving an indication of a monetary donation amount from the donor for the selection;

(i) the second Internet website receiving payment information from the donor for the monetary donation amount;

(j) the second Internet website receiving delivery information from the donor for the selection;

(k) the second Internet website providing confirmation information to the donor for the selection; and (l) the second Internet website collecting transactional data concerning the donor, the monetary donation amount, and the selection.

2. The method of claim 1 wherein step (e) comprises providing for the purchase of at least one of a report, a postcard, or a book.

3. The method of claim 1 wherein step (e) comprises displaying a plurality of tangible items, the tangible items being at least a report, a postcard, or a book.

4. The method of claim 1 wherein step (e) comprises providing textual information regarding at least one contribution option.

5. The method of claim 1 and further comprising the step of the second Internet website providing the transactional data to the charitable organization.

6. The method of claim 1 wherein step (g) comprises receiving a plurality of selections of contribution options and, for each selection of a contribution, further comprising the steps of receiving an indication of a monetary donation amount from the donor for each selection; receiving payment information from the donor for the monetary donation amount for each selection; receiving delivery information from the donor for each selection; and providing confirmation information to the donor for each selection.

7. A method for a plurality of donors to make a monetary charitable contribution to a plurality of charitable organizations, comprising the steps of:

(1) for a first donor
  (a) receiving at a first Internet website an indication of interest from a first donor to make a monetary contribution to a first charitable organization, the first Internet website being an Internet website of the first charitable organization;
  (b) hyperlinking the first donor to a third Internet website to allow the first donor to make the monetary contribution to the first charitable organization, the third Internet website being neither an Internet website of the first charitable organization nor an Internet website of a second charitable organization;
  (c) the third Internet website providing information regarding projects of the first charitable organization to the first donor;
  (d) the third Internet website receiving a selection of a project from the first donor;
  (e) the third Internet website providing a plurality of contribution options to the first donor for the selected project for the first charitable organization, the contribution options comprising at least a gift and at least one of the following other contribution options; a sponsorship level, a membership, or a purchase of a tangible item;
  (f) the third Internet website providing information to the donor regarding a minimum monetary donation amount and a tax deductible amount in conjunction with at least one of the other contribution options;
  (g) the third Internet website receiving a selection of a contribution option from the first donor;
  (h) the third Internet website receiving an indication of a monetary donation amount from the first donor for the selection;
  (i) the third Internet website receiving payment information from the first donor for the monetary donation amount;
  (j) the third Internet website receiving delivery information from the first donor for the selection;
  (K) the third Internet website providing confirmation information to the first donor for the selection; and
  (l) the third Internet website collecting transactional data concerning the first donor, the donation amount, and the selection; and (2) for a second donor:
  (a) receiving at a second Internet website an indication of interest from a second donor to make a monetary contribution to a second charitable organization, the second Internet website being an Internet website of the second charitable organization;
  (b) hyperlinking the second donor to the third Internet website to allow the second donor to make the monetary contribution to the second charitable organization;
  (c) the third Internet website providing information regarding projects of the second charitable organization to the second donor;
  (d) the third Internet website receiving a selection of a project from the second donor;
  (e) the third Internet website providing a plurality of contribution options to the second donor for the selected project for the second charitable organization, the contribution options comprising at least a gift and at least one of the following other contribution options; a sponsorship level, a membership, or a purchase of a tangible item;
  (f) the third Internet website providing information to the donor regarding a minimum monetary donation amount and a tax deductible amount in conjunction with at least one of the other contribution options;
  (g) the third Internet website receiving a selection of a contribution option from the second donor;
  (h) the third Internet website receiving an indication of a monetary donation amount from the second donor for the selection;
  (i) the third Internet website receiving payment information from the second donor for the monetary donation amount;

(j) the third Internet website receiving delivery information from the second donor for the selection;

(k) the third Internet website providing confirmation information to the second donor for the selection; and (l) the third Internet website collecting transactional darn concerning the second donor, the donation amount, and the selection.

8. The method of claim 7 and further comprising the steps of the third Internet website providing the transactional data for the first donor to the first charitable organization and providing the transactional data for the second donor to the second charitable organization.

9. A method for first and second charitable organizations having respective first and second Internet websites to use a central Internet website in conjunction with receiving monetary charitable contributions from donors, the central Internet website not being an Internet website of either the first or the second charitable organization; comprising the steps of:

(1) for the first charitable organization having the first Internet website:

(a) linking to the central Internet website;

(b) providing to the central Internet website a plurality of projects of the first charitable organization;

(c) providing to the central Internet website a plurality of contribution options for each of the projects of the first charitable organization, the contribution options comprising at least a gift and at least one of the following other contribution options: a sponsorship level, a membership, or a purchase of a tangible item;

(d) providing to the central Internet website at least one of a description or a picture of each of the contribution options;

(e) providing to the central Internet website a minimum monetary donation amount and a tax deductible amount in conjunction with at least one of the other contribution options;

(f) providing to the central Internet website an address for receiving transactional data concerning contributions to the first charitable organization; and (g) providing at the first Internet website a link from the first Internet website to the central Internet website to allow a donor to make a monetary contribution to the first charitable organization; and (2) for the second charitable organization having the second Internet website:

(a) linking to the central Internet website;

(b) providing to the central Internet website a plurality of projects of the second charitable organization;

(c) providing to the central Internet website a plurality of contribution options for each of the projects of the second charitable organization, the contribution options comprising at least a gift and at least one of the following other contribution options: a sponsorship level, a membership, or a purchase of a tangible item;

(d) providing to the central Internet website at least one of a description or a picture of each of the contribution options;

(e) providing to the central Internet website a minimum monetary donation amount and a tax deductible amount in conjunction with at least one of the other contribution options;

(f) providing to the central Internet website an address for receiving transactional data concerning contributions to the second charitable organization; and (g) providing at the second Internet website a link from the second Internet website to the central Internet website to allow a donor to make a monetary contribution to the second charitable organization.

* * * * *